United States Patent [19]

Kent

[11] 3,944,284
[45] Mar. 16, 1976

[54] TILTING, SLIDING EDGE DISPENSER

[76] Inventor: Loren W. Kent, 1239 E. Carleton Ave., Orange, Calif. 92667

[22] Filed: Dec. 6, 1974

[21] Appl. No.: 530,140

[52] U.S. Cl. ............................... 298/14; 214/313
[51] Int. Cl.² ............................................ B60P 1/30
[58] Field of Search ........... 298/12, 13, 14, 18, 22 P, 298/22 R, 22 D, 27; 214/502, 313, 307; 105/247, 270, 271

[56] References Cited
UNITED STATES PATENTS

| | | | |
|---|---|---|---|
| 1,633,364 | 6/1927 | Carvalho | 298/12 |
| 1,969,933 | 8/1934 | Le Tourneau | 298/27 |
| 2,515,334 | 7/1950 | Buye et al. | 298/27 X |

Primary Examiner—Frank E. Werner
Attorney, Agent, or Firm—Raymond L. Madsen

[57] ABSTRACT

There is disclosed a container having an aperture therein with a linear edge, which aperture is normally closed by the planar surface of the base member. The container is pivotally attached to the base member by connecting arms such that when the container is moved with respect to the base member, the container is constrained by the connecting rods and tilts and slides on the linear edge across the planar surface of the base member to open the aperture of the container and to dispense the contents therefrom.

8 Claims, 16 Drawing Figures

TILTING, SLIDING EDGE DISPENSER

The present invention relates to dispensing containers and more particularly to unloading and dumping containers and structures for vehicles.

In the field of unloading and dumping containers and structures for vehicles, it has been the general practice to employ enclosures and containers which are hinged to main frame and which rotate about the hinge point to perform a dumping action by tilting the enclosure to slideably remove the contents thereof. Although such devices have served the purpose, they have not proved entirely satisfactory under all conditions in service for the reason that considerable difficulty has been experienced in removing the contents of the tilting container and difficulties encountered in causing the vehicle to which the container is attached to become unbalanced and to overturn when the structure is tilted into the dumping position.

Those concerned with the development of dumping structures and dump bodies for vehicles have long recognized the need for a mechanism or structure for removing the contents of a vehicle or truck body container which does not present a hazard to the vehicle and its operator. The present invention fulfills this need.

One of the most critical problems confronting designers of dumping structures for vehicles has been the tilting and the raising of the dumping containers to such angles and heights which unbalance the vehicle and cause it to overturn. This problem is overcome by the present invention.

Another critical problem confronting designers of dumping structures has been the complete removal of all the contents of the dumping container. This problem is overcome by the present invention.

Prior to the present invention, dumping structures were characterized by tilting mechanisms which tilt the dumping containers to an angle where the force of gravity causes the contents to slide therefrom and to be dumped. Many times the contents of the dumping container cling to the interior surface thereof and the force of gravity is insufficient to cause the contents to be removed from the container. It therefore becomes necessary for the vehicle to be operated in a manner to produce an impulse force on the dumping container to loosen the contents and expedite removal thereof. Under these circumstances, those vehicles with particularly long dumping structures or bodies must tilt one end of the dumping structure to extreme heights above the vehicle to dispense the contents. This creates a hazard to the vehicle as well as the operating personnel, if the vehicle and dumping structure is not perfectly level. Should the vehicle be on a tilted surface, the weight of the load raised up to extreme heights above the vehicle creates a torque tending to overturn the vehicle and dumping structure. In some instances the operating personnel must enter the dumping container and manually loosen the contents for complete dumping or dispensing.

The general purpose of this invention is to provide a dispensing or dumping container which embraces all the advantages of similarly employed dumping and unloading structures and devices and possesses none of the aforedescribed disadvantages. To attain this, the present invention contemplates a unique sliding and tilting container and structural arrangement whereby instability of the dumping structure and adhering of the load contents to the container are avoided.

An object of the present invention is a provision of a dumping or dispensing container wherein the contents are removed therefrom by the sliding and scraping action of one edge.

Another object is to provide a dumping and dispensing structure wherein the center of gravity is shifted to minimal distance by the dumping or dispensing action of the structure.

A further objective of the invention is the provision of a dispensing container which slides across the planar surface of a base member and tilts simultaneously to dispense the contents therefrom.

Still another object is to provide a dumping container for a vehicle which permits the contents of the container to be dispensed on either side of the vehicle and to be removed therefrom by the positive action of a scraping and sliding edge of the container.

Other objects and many of the attendant advantages of this invention will be readily appreciated as the same becomes better understood by reference to the following detailed description when considered with the accompanying drawings in which like reference numerals designate like parts throughout the figures thereof.

Figure 5A:
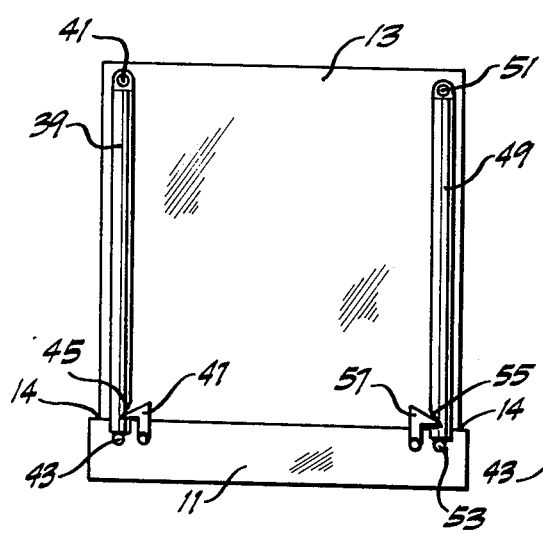
Figure 5B:
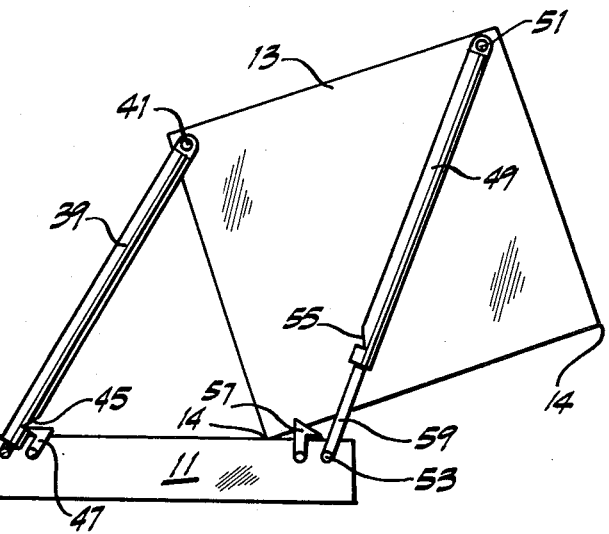
Figure 5C:
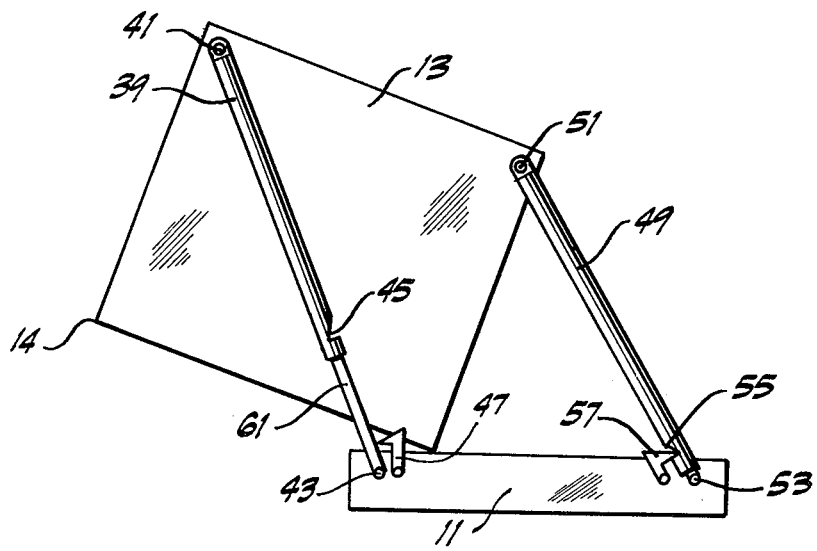
Figure 6:
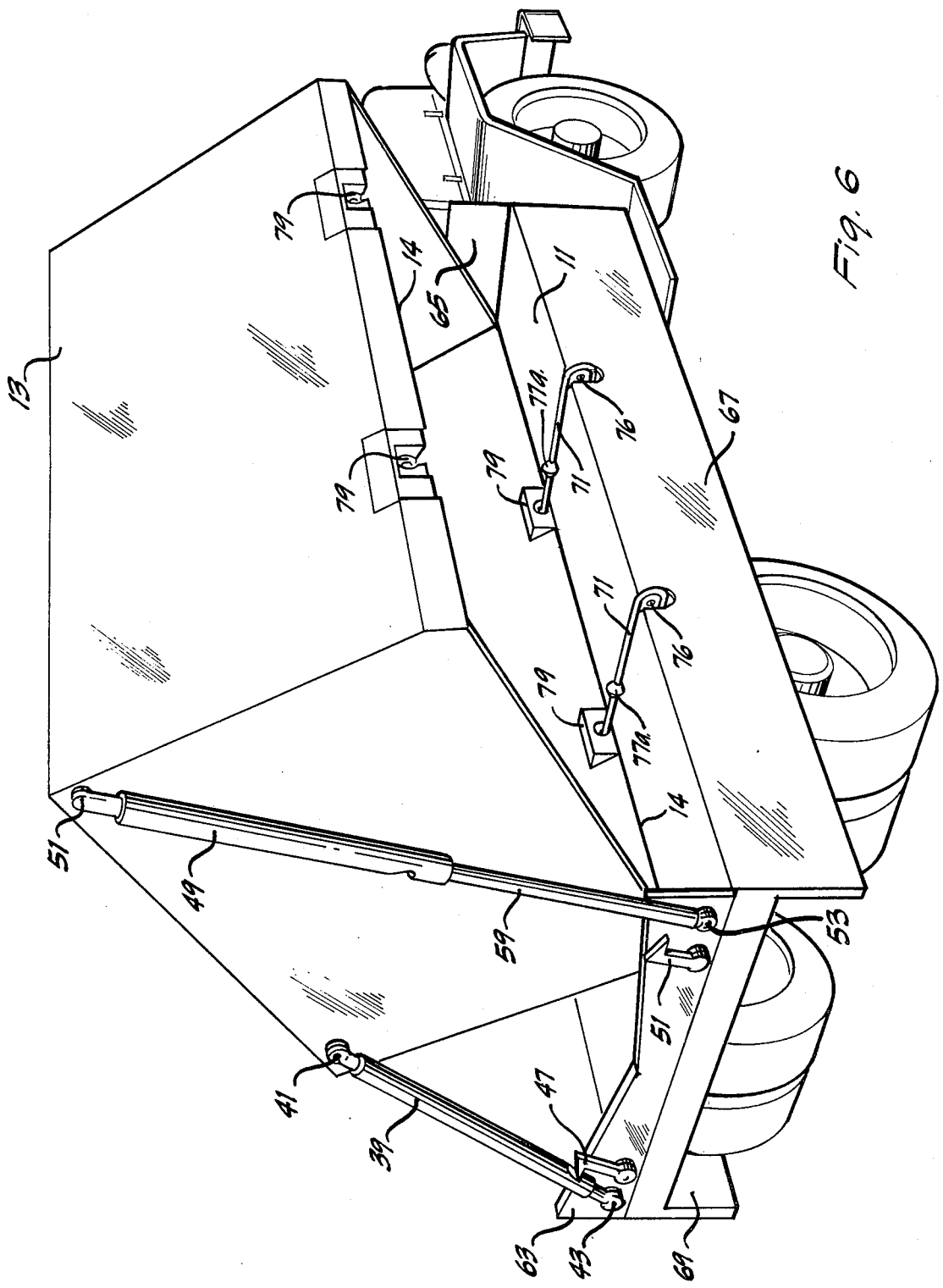
Figure 7:
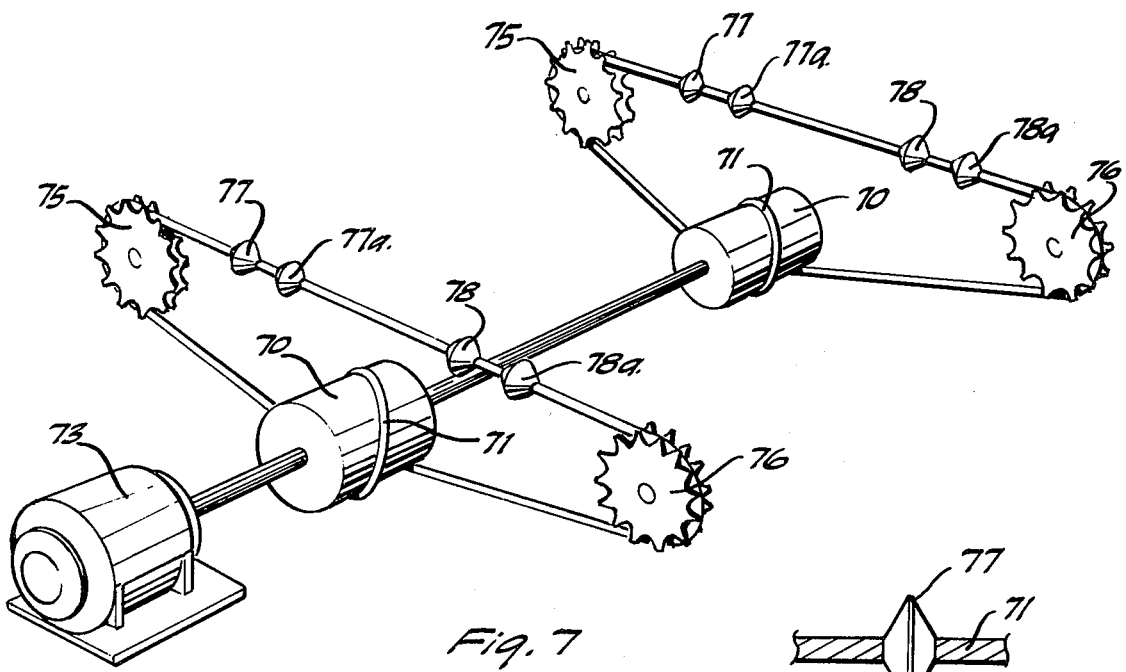
Figure 10:
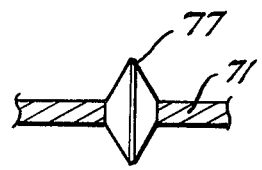
Figure 8:
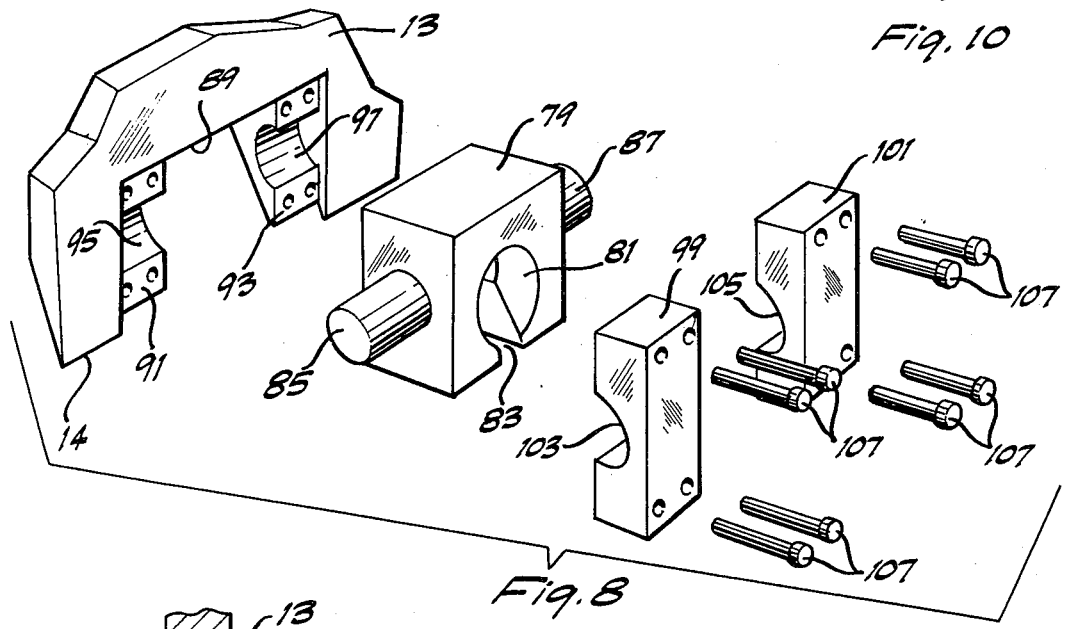
Figure 11:
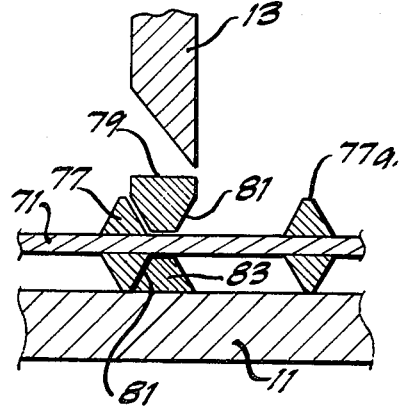
Figure 9:
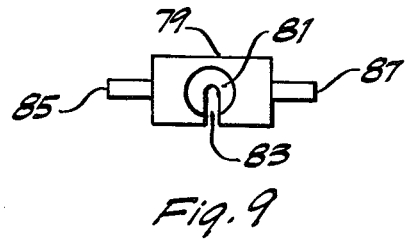

FIGS. 5A, 5B, and 5C illustrate side elevations of three positions of a dual sliding edge embodiment of the present invention;

FIG. 6 shows a pictorial view of a dual sliding edge container with a cable drive system mounted on a vehicle;

FIG. 7 illustrates a pictorial view of the cable drive mechanism of FIG. 6 for moving the container;

FIG. 8 shows an exploded pictorial view in section of one of the cable engaging members mounted in one of the sliding edges of the container of FIG. 6 which is engaged by the drive mechanism of FIG. 7;

FIG. 9 is a front view of the cable engaging member of FIG. 8;

FIG. 10 shows a side view of the cable coupling disc attached to the driving cable of FIG. 7; and FIG. 11 illustrates a cross-section view in section of the container taken through the center of the cable engaging member of FIG. 8 engaged by the cable coupling disc of FIG. 10.

Figure 1:
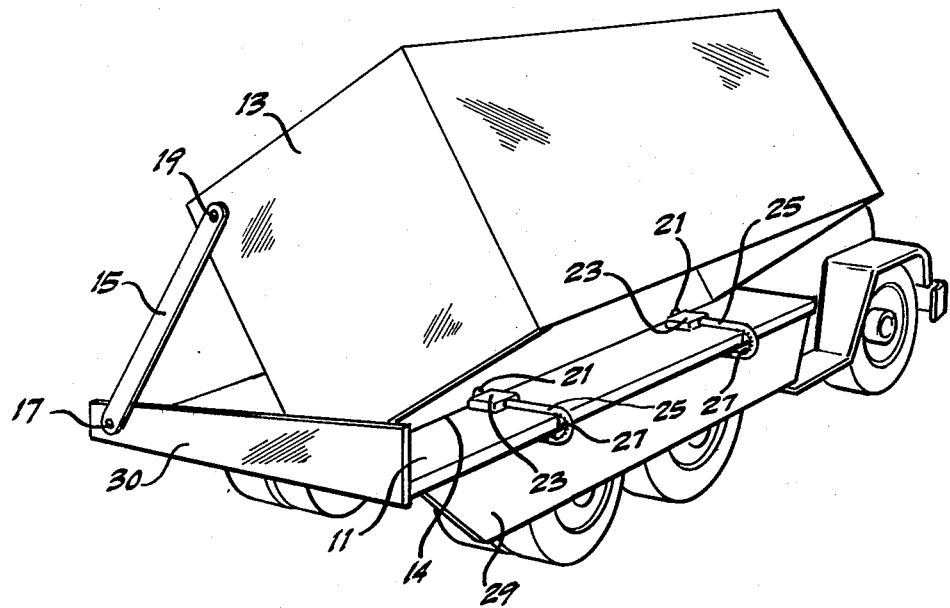
FIG. 1 shows a pictorial view of a vehicle mounted, side dumping, single sliding edge tilting container embodiment of the invention.

Referring now to the drawings, wherein like reference characters designate like corresponding parts throughout the several views, there is shown in FIG. 1 (which illustrates preferred embodiment of a single sliding edge container) a base member 11 having a planar surface thereon, such as the flat bed of a dumping vehicle, upon which a rectangular container 13 slides on a linear edge 14. One end of an arm 15 is rotatably connected to a pin 17 which is fixedly attached to the lower left corner of base member 11. The other end of arm 15 is rotatably attached to a pin 19 which in turn is fixedly attached to the upper left corner of container 13. Linear edge 14 has two cut-outs or openings 21 therein which are respectively engaged by lugs 23 which in turn are attached each to one of two cables 25. Cables 25 traverse the surface of base member 11 and around two pulleys 27 mounted in the edge of base member 11 to a drive mechanism or winch (not illustrated) mounted on the underside of base member 11. A side panel 29 is mounted on the underside of base member 11 along the edge thereof to keep debris from interfering with wheels of a vehicle upon which the dumping or dispensing structure may be mounted. A panel 30 is attached to each end of base member 11 (one end panel not being visible) to prevent the dispensing of the contents of container 13 from the ends of base member 11. Therefore, FIG. 1 illustrates a single sliding edge embodiment of a dumping or dispensing structure for dumping from one side of a vehicle such as a truck or railway car.

Figure 2A:
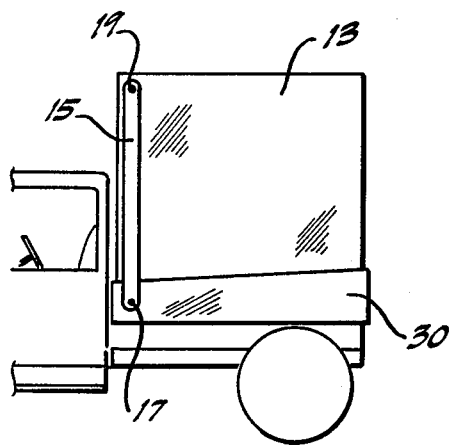
FIGS. 2A and 2B illustrate side views of two positions of a single sliding edge rear dumping structure for a vehicle.
Figure 2B:
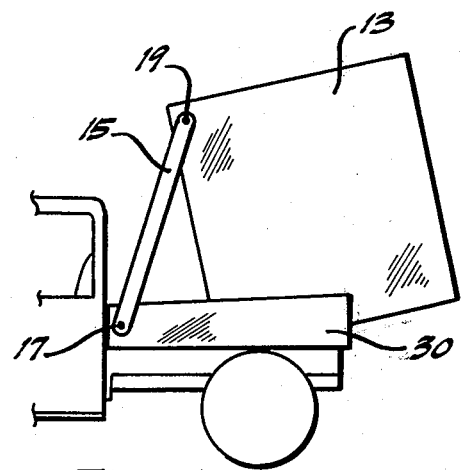

FIGS. 2A and 2B illustrate side views of a dispensing structure similar to that shown in FIG. 1 but assembled in a configuration to provide dispensing or dumping from the rear of a vehicle. FIG. 2A shows container 13 in a normally closed position and FIG. 2B illustrates container 13 tilted and moved into a partial dumping or dispensing position. Although not visible, the opposite side is a mirror image of the side illustrated.

In FIG. 2A, container 13 is in a normally closed position with the edges of the open bottom thereof fully contacting and closed by base member 11 (not visible behind panel 30). Arm 15 is connected to container 13 in the upper left corner by pin 19 and to the left corner of base member 11 by the other end thereof through pin 17. Panel 30 is attached to each side of base member 11 for containing the contents of container 13 as it slides and tilts so that the contents are dispensed from the rear of the vehicle and not from the sides.

In FIG. 2B, container 13 is shown tilted and in a sliding position with respect to base member 11 (not visible behind panel 30) to open the bottom thereof and dispense the contents. Arm 15 attached to container 13 by pin 19 and attached to base member 11 by rotary pin 17 constrains the container as it is moved over the surface of base member 11 thereby causing the container to tilt. Panels 30, as in FIG. 2A, contain the contents of the container to prevent dispensing thereof from the sides of the vehicle.

Figure 3A:
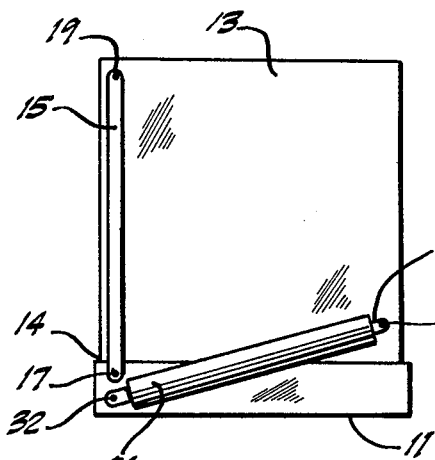
FIGS. 3A and 3B illustrate side elevations of two positions of a single sliding edge container similar to those shown in FIGS. 1, 2A and 2B further including a hydraulic actuator.
Figure 3B:
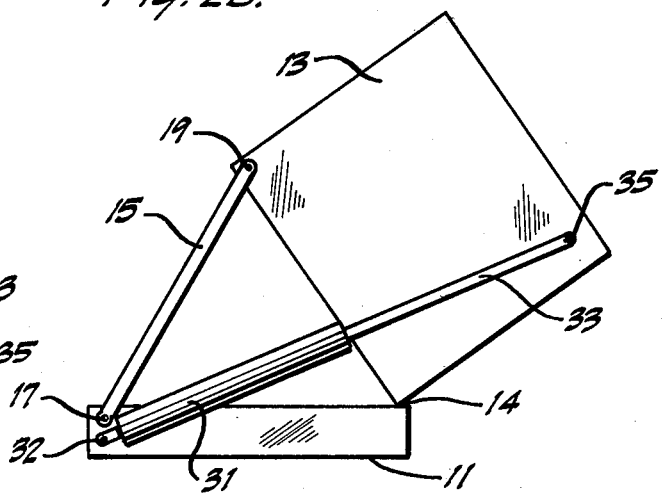

FIGS. 3A and 3B show the end view or side elevation of the structure FIG. 1 or the structure of FIGS. 2A and 2B further including a hydraulic drive mechanism for moving and sliding container 13 across base member 11. Although not visible, the opposite side or end is a mirror image of the side or end illustrated.

FIG. 3A shows container 13 in its normally closed position fully resting on base member 11. Panel 30 is removed and not illustrated so that the relationship between container 13 and base member 11 may be observed. Connecting arm 15 has one end rotatably attached through pin 19 to the upper left corner of the side or end panel of container 13 and the other end rotatably attached to the left corner of base member 11 by pin 17. Sliding edge 14 is shown in substantial alignment with the left edge of base member 11. A hydraulic cylinder 31 is rotatably attached to base member 11 through a rotary joint 32 slightly below and adjacent to pin 17. A piston arm 33 which moves within hydraulic cylinder 31 is connected through a rotary joint 35 to the lower right corner area of the side or end panel of container 13.

In FIG. 3B, piston arm 33 is shown extended from cylinder 31 to slide and tilt container 13 into a position where edge 14 of container 13 is adjacent the right edge of base member 11 directly opposite the left edge of base member 11 to which edge 14 was adjacent when the container was closed. Pin 19 attached to the upper left corner of the end panel of container 13 moves along the arc of a circle having a radius equal to the length of arm 15 and with a center at pin 17.

Figure 4A:
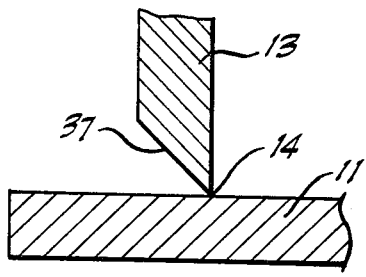
FIGS. 4A and 4B illustrate a cross-section view in section of the beveled sliding edge of the tilting container.
Figure 4B:
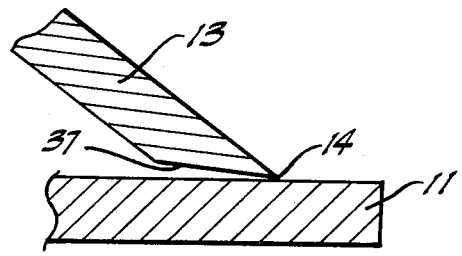

FIGS. 4A and 4B illustrate a cross-section view partly in section of the wall of container 13 and sliding edge 14 in contact with base member 11.

In FIG. 4A container 13 is shown in its normally closed position with sliding edge 14 adjacent to the left edge of base member 11. The edge of container 13 is beveled or cut on an angle forming a surface 37 and making sliding edge 14 substantially into a knife edge.

FIG. 4B illustrates a cross-section view partly in section of container 13 tilted in its fully open or dispensing position with sliding edge 14 adjacent the right edge of base member 11. The angle of surface 37 is selected to allow container 13 to tilt as required and always keep the knife edge of sliding edge 14 in contact with the surface of base member 11.

FIGS. 5A, 5B and 5C illustrate a side view of a container with double sliding edges which can dispense its contents from either of opposite edges of base member 11. Although not visible, the opposite side of the container is a mirror image of that illustrated.

In FIG. 5A, container 13 is shown normally closed by base member 11. An adjustable or extending arm 39 is shown rotatably attached to upper left corner of the end panel of container 13 by a rotary joint 41. The other end of adjustable arm 39 is attached to left corner of base member 11 through a rotary joint 43. Adjustable arm 39 has a notch or lip 45 therein engaged by a spring biased hook 47 which is rotatably attached to base member 11 adjacent to rotary joint 43. Similarly, an adjustable or extending arm 49 is attached to the upper right corner of the end panel of container 13 by a rotary joint 51. The other end of the adjustable arm 49 is rotatably attached to the right corner of base member 11 by a rotary joint 53. A spring biased hook 57 is rotatably mounted adjacent rotary joint 53 and engages a notch or lip 55 on adjustable arm 49.

In FIG. 5B container 13 is shown with its left sliding edge 14 moving from left to right across base member 11 to dispense the contents of container 13 to the right side of base member 11. Adjustable arm 39 rotates in a clockwise direction from the position shown in FIG. 5A, keeping notch 45 engaged by hook 47, thereby maintaining adjustable arm 39 at constant length. However, hook 57 has a stop (not visible) which prevents it from rotating in a clockwise direction and therefore, it disengages notch 55 of adjustable arm 49 to allow arm 49 to extend and lengthen or elongate as required by the tilting action of container 13. Adjustable arm 49 has a central bore into which one end of a rod 59 is slideably inserted to provide adjustable length, the other end of rod 59 being rotatably attached to pin 53.

In FIG. 5C container 13 is illustrated with its right sliding edge 14 moving from right to left across the surface of base member 11 to dump the contents thereof on the left side of base member 11. Adjustable arm 49 rotates in counter-clockwise direction about rotary joint 53 and is constrained from expanding by hook 57 engaging notch 55 therein. However, adjustable arm 39 rotates counter-clockwise and is disengaged from hook 47 which is prevented from rotating counter-clockwise by a constraint or stop (not visible). This allows adjustable arm 39 to extend by the withdrawal of a sliding rod 69 from a central bore therein similar to adjustable arm 49.

FIG. 6 illustrates the double-edge tilting container of FIGS. 5A, B and C mounted on a truck body. Container 13 is shown moving from left to right thereby dispensing its contents to the right side of the truck. Adjustable arm 39 is connected to the upper left corner of the end panel of container 13 by rotary joint 41 and to the rear left corner base member 11 by rotary joint 43. Adjustable arm 39 is engaged by hook 47 and maintains a constant length as container 13 is moved left to right across base member 11. Adjustable arm 49 is disengaged from hook 51 and is free to extend in length by the withdrawal of sliding arm 59. Adjustable arm 49 is connected by rotary joint 51 to the upper right corner of the end panel of container 13 and is further connected through sliding arm 59 to rotary joint 53 connected to the rear right corner of base member 11. Rear panel 63 is connected to the end of base member 11 at the rear of the truck and front panel 65 is connected to the end of base member 11 toward the front of the truck to prevent the contents of container 13 from being dispensed at either end of base member 11. A side panel 67 is connected to the right underside edge of base panel 11 and a side panel 69 is connected to the left underside edge of base member 11 to prevent the contents dispensed from container 13 from falling under the wheels of the truck. Although not visible, the end of container 13 most near the front of the truck is the mirror image of the end illustrated.

Each sliding edge 14 of container 13 has two cable coupling members 79 rotatably mounted therein. The left edge 14 is shown moving from left to right across base member 11 and each coupling member 79 therein is engaged by a coupling disc or ring (not visible) attached to a cable 71 which is driven around a sprocket pulley 76 by a winch mechanism (not visible). A coupling disc 77a on each cable is located adjacent each coupling member 79 out to the right thereof to engage such coupling member when left sliding edge 14 is moved from right to left across base member 11 back to its initial starting position. Coupling members 79 in right sliding edge 14 of container 13 are tilted up and away from the cable coupling discs and are therefore not engaged by the coupling discs when the left sliding edge is being driven across base member 11.

FIG. 7 illustrates a pictorial view of a cable drive or winch mechanism which may be utilized to drive either the single sliding edge dispenser of FIG. 1 or the double sliding edge dispenser of FIGS. 5A, B, and C and FIG. 6. A cable driving drum or winch 70 has a cable 71 wrapped therearound and is driven by a motor 73. Cable 71 further traverses sprocket pulleys 75 and 76 mounted in opposite edges of base member 11 (not shown) and has coupling discs or rings 77 and 77a attached thereto to engage a coupling member in one sliding edge of container 13 (not illustrated). For the double sliding edge dispensing container, a second pair of coupling discs 78 and 78a are further connected to cable 71 to engage a coupling member in the opposite sliding edge of container 13. Duplicate sets of cable drives are illustrated in FIG. 7 to provide two points of drive spaced along each sliding edge of container 13.

These two points of drive provide a more uniform application of force to the container and buckling or bowing of the wall and edge of the container is prevented under the weight of the contents of the container while sliding across the surface of base member 11. Sprocket pulleys 75 and 76 have toothlike notches around their circumference to accommodate coupling discs 77, 77a, 78 and 78a, respectively, as the cable and coupling discs pass over and around the sprocket pulleys.

FIG. 8 illustrates a section of the wall of container 13 adjacent to sliding knife edge 14 having a cut-out or opening 89 therein into which coupling member 79 is located. Coupling member 79 has a conical depression 81 into which the cable coupling disc is positioned and a slot 83 into which the cable between coupling discs slides when the coupling member is engaged and driven by the cable. Pivot rods 85 and 87 are attached to opposite sides of coupling member. Rod 85 engages a support bracket 91 on one side of opening 89 and rod 87 engages a support bracket 93 in the other side of opening 89. Brackets 91 and 93 have elongated recesses 95 and 97, respectively, onto which pivot rods 85 and 87 are located, respectively. Clamps 99 and 101 have elongaged recesses 103 and 105, respectively, and are attached by bolts 107 to support brackets 91 and 93, respectively, to moveably hold pivot rods 85 and 87 of coupling member 79 in the elongated slots formed when recesses 95, 103 and 97, 105 are juxtaposed, respectively. The elongated slots allow coupling member 79 to move relative to opening 89 as container 13 tilts.

FIG. 9 shows a front view of coupling member 79 with conical depression 81, slot 83 and pivot rods 85 and 87 on each side, respectively. The back side of coupling member is the mirror image of the front side.

FIG. 10 shows a section of cable 71 with coupling ring or disc 77 mounted thereon. Disc 77 is shaped to have mating conical sections which mate with the conical depressions in the coupling member.

FIG. 11 illustrates a cross-section view, partly in section, of the wall of the container 13, the cross-section being taken through the center of opening 89 of FIG. 8 including coupling member 79 and with cable 71 and coupling discs 77 and 77a attached thereto. As cable 71 traverses from left to right in FIG. 11, coupling disc 77 engages conical depression 81 of coupling member 79 and moves container 13 from left to right across the surface of base member 11.

The single sliding edge embodiment of the dispensing container of the present invention can best be described by turning to FIG. 1. Container 13 is driven from its normal position, where the bottom opening therein is in complete contact with the surface of base member 11, by two sets of drive cables 25 and coupling lugs 23 attached thereto which engage openings 21 in sliding edge 14 of container 13. As the cables move from left to right across the surface of base member 11, lugs 23 engaged in openings 21 slide edge 14 across base member 11 from left to right. Arm 15 constrains the motion of container 13 causing it to tilt about edge 14 in a counter-clockwise direction and to lift the remaining bottom edge of container 13 from the surface of base member 11. As container 13 begins to tilt, the contents of container 13 begin to disperse from the right side of base member 11. As the container slides across base member 11, sliding edge 14 scrapes the contents from the surface of base member 11 thereby positively removing all of the contents of container 13 to be dispensed therefrom. Sliding edge 14 is driven across base member 11 from left to right until the entire surface is traversed and all the contents of container 13 dispensed. End panel 30 prevents the contents of container 13 from being dispensed over the rear end of base member 11, and along the edge thereof. A similar panel is mounted at the other end of base member 11 for the same purpose and function. Further, side panel 29 extends below base member 11 and along the edge thereof to prevent the dispensed materials from falling under the wheels of a vehicle upon which the dumping or dispensing mechanism may be mounted. A similar panel is mounted on the other side of base member 11 for the same reason.

The driving mechanism for the container illustrated in FIG. 1 may be that as illustrated in FIG. 7, eliminating coupling discs 78 and 78a. Lug 23 shown in FIG. 1 may be coupling disc 77a of FIG. 7, coupling disc 77 of FIG. 7 being behind the wall of container 13 in FIG. 1 and not visible.

An alternate method of driving container 13 across the surface of base member 11 is the hydraulic system of FIGS. 3A and 3B. Hydraulic cylinder 31 can be activated to drive piston arm 33 outwardly from cylinder 31 forcing container 13 to slide across base member 11 from left to right and dispense the contents therefrom.

It should be noted that the cable drive illustrated in FIG. 7 and the hydraulic actuators shown in FIGS. 3A and B are merely illustrative of the various driving methods and devices which may be utilized to slide container 13 across the surface of base member 11 and other motivating and driving mechanisms and devices may be used as desired.

It should also be noted that base member 11 may be the flat bed of a truck body or a transporting vehicle such as a railway car and that rectangular container 13 may be the containing walls of a dumping structure associated with the flat bed. As illustrated in FIGS. 2A and 2B, the single sliding edge dispensing apparatus described in FIG. 1 may also be utilized to dispense from the rear of a vehicle as well as the side of a vehicle, thereby giving diverse applications for the slidng and tilting dispensing system disclosed herein.

It is further important to note that as the sliding edge of container 13 slides across the surface of base member 11, it scrapes all of the contents of container 13 from the surface of container 11. This is distinctly different from the conventional dumping or dispensing containers apparatus where gravity is utilized to remove the contents. If container 13 were hinged about one edge and tilted with respect to the hinged edge, as in a conventional dumping mechanism, it would be necessary to have some other means for scraping the contents from the bottom of container 13. The sliding scraping edge of container 13 as illustrated in FIG. 1 provides a distinct and unique advantage over conventional dumping structures in that it positively removes all the contents of container 13 from the surface of base member 11.

The beveled edge of container 13 illustrated in FIGS. 4A and 4B prevents the material contained within container 13 from being caught under the edge of the container as it slides across the surface of base member 11. Therefore, the sliding knife edge 14 always remains in positive contact with base member 11 and scrapes the contents of container 13 from the surface of base member 11.

The double or dual sliding edge dispensing system is best described by turning to FIGS. 5A, B and C. Here, the left edge 14 of container 13 can slide from left to right across the surface of base member 11 to dispense the contents of container 13 from the right side of base member 11. Contrary thereto, the right 14 edge of container 13 can slide across the surface of base member 11 to dispense the contents of container 13 from the left edge of base member 11. As the left edge 14 of container 13 slides from left to right across base member 11, it is important to note that adjustable arm 39 must be kept constant in length. Therefore, hook 47 is adapted to engage notch 45 and prevent arm 39 from extending. However, it is also important to note that adjustable arm 49 must be free to extend its length so that container 13 may rotate under the constraint of arm 39 and keep sliding edge 14 in contact with the surface of base member 11. Therefore, it is clear that, whereas hook 47 must be adapted to engage notch 45 of arm 39, hook 57 must be adapted to disengage notch 55 of arm 49. In order to effect this action, hook 47 is biased in a counter-clockwise direction against a restraint or pin (not illustrated) such that it will not move any further in the counter-clockwise direction than the position illustrated in FIG. 5A. Similarly, hook 57 is biased in a clockwise a direction against a constraint (not illustrated) so that it will not rotate any further in the clockwise direction than the position shown in FIG. 5A. Consequently, as arms 39 and 49 rotate in a clockwise direction about rotary joints 43 and 53, respectively, hook 57 continues to engage notch 55 and constrains arm 49 from extending while notch 45 is disengaged from hook 47 allowing arm 39 to extend as required by the rotation of container 13 about sliding edge 14. It should be recognized that other techniques and devices may be utilized to provide adjustable connecting arms similar in effect to arms 49 and 39 and that different techniques and devices may be utilized for constraint other than hooks 47 and 57, respectively.

A preferred driving means for the container is illustrated in FIG. 7. Coupling discs 77 and 77a are attached to cable 71 and engage coupling member 79 rotatably mounted in the sliding edge of container 13 in opening 89 illustrated in FIG. 8. A dual set of cables is provided in FIG. 7 so that two driving points are formed along the sliding edge of container 13 whereby bowing of the side or edge of container 13 is prevented and a uniform and effective scraping action is obtained across the surface of base member 11.

The operation of the cable drive system of FIG. 7 is best illustrated by referring to FIG. 11. As coupling disc 77 moves from left to right it engages conical depression 81 in coupling member 79 and drives container 13 from left to right, sliding the edge thereof across the surface of base member 11. However, referring to FIG. 7, if the cable is driven from right to left, the left edge of container 13 will be lifted from the surface of container 11 allowing cable 71 to slip out of slot 83 of coupling member 79 and coupling disc 77a to pass under coupling member 79 mounted in opening 89 (shown in FIG. 8) of the left edge of container 13. However, coupling disc 78a (shown in FIG. 7) will engage a similar opening 89 in the right edge (not illustrated) of container 13 to drive the right edge across the surface of base member 11 from right to left. As the cable continues to move from right to left, coupling discs 77 and 77a traverse sprocket pulley 75 and continue around drive drum 70. As illustrated in FIG. 7, sprocket pulleys 75 and 76 have notches or teeth therein to receive the edges of coupling discs 77, 77a, 78, and 78a, respectively. Furthermore, it should be clear that the cable drive mechanism of FIG. 7 may be utilized to drive the dispensing system displayed in FIGS. 5A, B and C to either dispense to the left or right of base member 11 depending upon which direction the cable is driven.

Although a cable driving system and a hydraulic driving system are illustrated and explained herein, other techniques of moving container 13 across the surface of base member 11 may be utilized, such as chain drives, gear drives, and other techniques and devices well known in the art of mechanical driving and moving.

Although the dispensing container described herein has been discussed in connection with full sized trucks and other vehicles, it should be realized that it is also applicable to toy vehicles such as toy trucks and toy trains and other play vehicles.

It now should be apparent that the present invention provides a mechanical configuration which may be employed in conjunction with a dispensing or dumping container for dispersing the contents thereof by sliding and tilting the container with respect to a base member such that the center of gravity of the dispensing structure is not substantially changed and a positive scraping action is obtained by the sliding edge of the container across the base member.

Although particular structural elements have been discussed in connection with a specific embodiment of a dispensing mechanism and apparatus constructed in accordance with the teachings of the present invention, others may be utilized. Furthermore, it will be understood that although an exemplary embodiment of the present invention has been disclosed and discussed, other applications and mechanical arrangements are possible and that the embodiments disclosed may be subject to various changes, modifications and substitutions without necessarily departing from the spirit of the invention.

What is claimed is:

1. Dispensing apparatus comprising:
   a base member having a flat planar surface thereon;
   a container having at least one opening therein, said opening being normally closed by said planar surface when said container is in a first position relative to said base member, a portion of said opening having a linear edge, said container being adapted to be moved across said planar surface from said first position to a second position, keeping said linear edge in sliding contact with said planar surface; and
   connecting means having two ends, one end being rotatably attached to said container and the other end rotatably attached to said base member such that when said container is moved across said planar surface from said first position to said second position, said container tilts with respect to said planar surface and slides thereacross on said linear edge thereby opening said container to release the contents thereof and to scrape the contents before said linear edge.

2. The dispensing apparatus described in claim 1 wherein said base member is a flat rectangular platform and wherein said container is a rectangular enclosure and said opening therein is an open side of said rectangular enclosure, one edge of said open side being said linear edge, said open side having dimensions similar to said rectangular base member.

3. The dispensing apparatus described in claim 2 wherein said connecting means is a pair of arms, one arm being rotatably attached between a corner of said enclosure remote from said base member and a corner of said base member directly opposite said remote corner when said enclosure is in said first position, and the other arm being rotatably attached between the corresponding corner of the opposite side of said enclosure and the corresponding corner of the opposite edge of said base member, the edge of said open side located between said rods when said enclosure is in said first position being said linear edge.

4. The dispensing apparatus described in claim 3 further including driving means for moving said enclosure across said base member, comprising:
   at least one pair of pulley wheels rotatably mounted on opposite edges of said base member, said opposite edges being parallel to said linear edge of said enclosure;
   winch means for pulling cable, said winch means being mounted on the side of said base member oppositely disposed from said planar surface;
   cable connected to said winch means and running over said pair of pulley wheels and across said planar surface of said base member; and
   lug means attached to said cable for engaging said linear edge of said enclosure to drive said linear edge across said planar surface when said winch drives said cable.

5. Dispensing apparatus comprising:
   a base member having a flat planar surface thereon;
   container means for holding dispensable contents, said container means having at least one opening therein normally closed by said planar surface when said container is in a first position, said opening having first and second linear edges, said container means being adapted to be moved from said first position to a second position while maintaining said first linear edge in sliding contact with said planar surface and from said first position to a third position while maintaining said second linear edge in sliding contact with said planar surface; and
   first and second connecting means, each having adjustable lengths and two ends, one end of each being rotatably attached to said container and the other end of each being rotatably attached to said base member, the length of said first connecting means being constrained and the length of said second connecting means being unconstrained when said container is moved from said first position to said second position, said first connecting means being located to tilt said container about said first linear edge thereby opening said container in a first direction, the length of said first connecting means being unconstrained and the length of said second connecting means being constrained when said container is moved from said first position to said third position, said second connecting means being located to tilt said container about said second linear edge, thereby opening said container in a second direction whereby said dispensable contents may be dispensed in one of two different directions.

6. The dispensing apparatus described in claim 5 wherein said base member is a flat rectangular platform and wherein said container is a rectangular enclosure and said opening therein is an open side of said rectangular enclosure, opposite edges of said open side being said first and second linear edges, said open side having dimensions similar to said rectangular platform.

7. The dispensing apparatus described in claim 6 wherein said first and second connecting means each include a pair of arms, one arm of each pair being rotatably attached between a corner of said enclosure remote from said base member and a corner of said base member directly opposite said remote corner when said enclosure is in said first position, and the other arm of said pair being rotatably attached between the corresponding corner of the opposite side of said enclosure and the corresponding corner of the opposite edge of said base member, the edges of said open side located between said pairs of arms when said enclosure is in said first position being said first and second linear edges.

8. The dispensing apparatus described in claim 7 further including driving means for moving said enclosure across said base member, comprising:
- at least one pair of pulley wheels rotatably mounted on opposing edges of said base member, said opposing edges being parallel to said first and second linear edges of said enclosure;
- winch means for pulling cable mounted on the side of said base member oppositely disposed from said planar surface;
- cable connected to said winch means and running over said pair of pulley wheels across said planar surface of said base member; and
- coupling means attached to said cable means for engaging said first and second linear edges of said enclosure to drive said first linear edge across said planar surface when said winch pulls said cable in one direction and to drive said second linear edge across said planar surface when said winch pulls said cable in the reverse direction.

* * * * *